United States Patent
De et al.

(10) Patent No.: US 9,805,376 B2
(45) Date of Patent: Oct. 31, 2017

(54) PERMITTING GRANULAR DISTRIBUTION OF PRIVILEGES TO CONTEXTUAL COMMUNITIES

(75) Inventors: Pradipta De, New Delhi (IN); Kuntal Dey, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/311,876

(22) Filed: Dec. 6, 2011

(65) Prior Publication Data

US 2013/0144698 A1    Jun. 6, 2013

(51) Int. Cl.
G06Q 10/00    (2012.01)
G06Q 30/02    (2012.01)

(52) U.S. Cl.
CPC ......... *G06Q 30/02* (2013.01); *G06Q 30/0207* (2013.01); *G06Q 30/0235* (2013.01); *G06Q 30/0239* (2013.01)

(58) Field of Classification Search
CPC  G06C 30/02; G06C 30/0207; G06C 30/0239; G06C 30/0222; G06C 30/0235; G06C 30/0214
See application file for complete search history.

(56) References Cited

U.S. PATENT DOCUMENTS

| | | | | |
|---|---|---|---|---|
| 6,862,575 | B1 * | 3/2005 | Anttila et al. | 705/14.14 |
| 2008/0208626 | A1 * | 8/2008 | Greenman | 705/2 |
| 2012/0150746 | A1 * | 6/2012 | Graham | 705/50 |
| 2012/0166261 | A1 * | 6/2012 | Velusamy et al. | 705/14.16 |
| 2012/0215618 | A1 * | 8/2012 | Myman et al. | 705/14.35 |
| 2012/0232974 | A1 * | 9/2012 | Castiglione | 705/14.21 |

OTHER PUBLICATIONS

Haake, Joerg M.; et al., "End-User Controlled Group Formation and Access Rights Management in a Shared Workspace System", CSCW '04, Proceedings of the 2004 ACM Conference on Computer Supported Cooperative Work, Nov. 6-10, 2004, 18 pages, ACM, New York, New York, USA.

"Oracle Beehive: A Flexible Collaboration Platform for the Enterprise", Aug. 2010, 17 pages, available at www.oracle.com/us/products/middleware/beehive/026988.pdf, as of Nov. 15, 2011.

(Continued)

*Primary Examiner* — William Brockington, III
(74) *Attorney, Agent, or Firm* — Ference & Associates LLC (57) ABSTRACT

Methods and arrangements for the granular distribution of privileges to contextual communities. A user request for an active capability is assimilated. A code is generated which permits exercise of the active capability by the user and at least one secondary recipient. Execution of the active capability is permitted responsive to an attempt at executing the active capability by at least one taken from the group consisting of: the user and the at least one secondary recipient, and execution of the active capability is denied responsive to an attempt at executing the active capability by a recipient other than the user and the at least one secondary recipient.

19 Claims, 4 Drawing Sheets

(56) References Cited

OTHER PUBLICATIONS

Cohen, Michael, et al., "Awareware: Narrowcasting Attributes for Selective Attention, Privacy, and Multipresence", 31 pages, available at citeseerx.ist.psu.edu/viewdoc/download?doi=10.1.1.154.8524&rep=rep1&type=pdf, as of Nov. 15, 2011.

St. Juste, Pierre, et al., "On the Use of Social Networking Groups for Automatic Configuration of Virtual Grid Environments", GCE '08, Grid Computing Environments Workshop, Nov. 12-16, 2008, 10 pages, Austin, Texas, USA.

"EMC Documentum Architecture: Foundations and Services for Managing Content across the Enterprise, a Detailed Review", white paper, Nov. 2009, 47 pages, available online at www.emc.com/collateral/software/white-papers/h3411-documentum-architecture-wp.pdf as of Dec. 6, 2011.

"Operating System", definition from Wikipedia, 22 pages, available online at en.wikipedia.org/wiki/Operating_system as of Dec. 6, 2011.

\* cited by examiner

PERMITTING GRANULAR DISTRIBUTION OF PRIVILEGES TO CONTEXTUAL COMMUNITIES

BACKGROUND

The advent and continued growth of electronic coupons and other electronically transmitted mercantile instruments (e.g., to a mobile phone or a computer) has permitted an unprecedented array of benefits to customers and vendors alike, allowing transactions or extensions of privileges that were previously not possible. However, much potential remains unrealized as customers typically are able only to employ the instruments for highly limited uses, and normally cannot transfer instruments or any associated privileges to others.

BRIEF SUMMARY

In summary, one aspect of the invention provides a method comprising: assimilating a user request for an active capability; generating a code which permits exercise of the active capability by the user and at least one secondary recipient; permitting execution of the active capability responsive to an attempt at executing the active capability by at least one taken from the group consisting of: the user and the at least one secondary recipient; and denying execution of the active capability responsive to an attempt at executing the active capability by a recipient other than the user and the at least one secondary recipient.

Another aspect of the invention provides an apparatus comprising: at least one processor; and a computer readable storage medium having computer readable program code embodied therewith and executable by the at least one processor, the computer readable program code comprising: computer readable program code configured to assimilate a user request for an active capability; computer readable program code configured to generate a code which permits exercise of the active capability by the user and at least one secondary recipient; computer readable program code configured to permit execution of the active capability responsive to an attempt at executing the active capability by at least one taken from the group consisting of: the user and the at least one secondary recipient; and computer readable program code configured to deny execution of the active capability responsive to an attempt at executing the active capability by a recipient other than the user and the at least one secondary recipient.

An additional aspect of the invention provides a computer program product comprising a computer readable storage medium having computer readable program code embodied therewith, the computer readable program code comprising: computer readable program code configured to assimilate a user request for an active capability; computer readable program code configured to generate a code which permits exercise of the active capability by the user and at least one secondary recipient; computer readable program code configured to permit execution of the active capability responsive to an attempt at executing the active capability by at least one taken from the group consisting of: the user and the at least one secondary recipient; and computer readable program code configured to deny execution of the active capability responsive to an attempt at executing the active capability by a recipient other than the user and the at least one secondary recipient.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
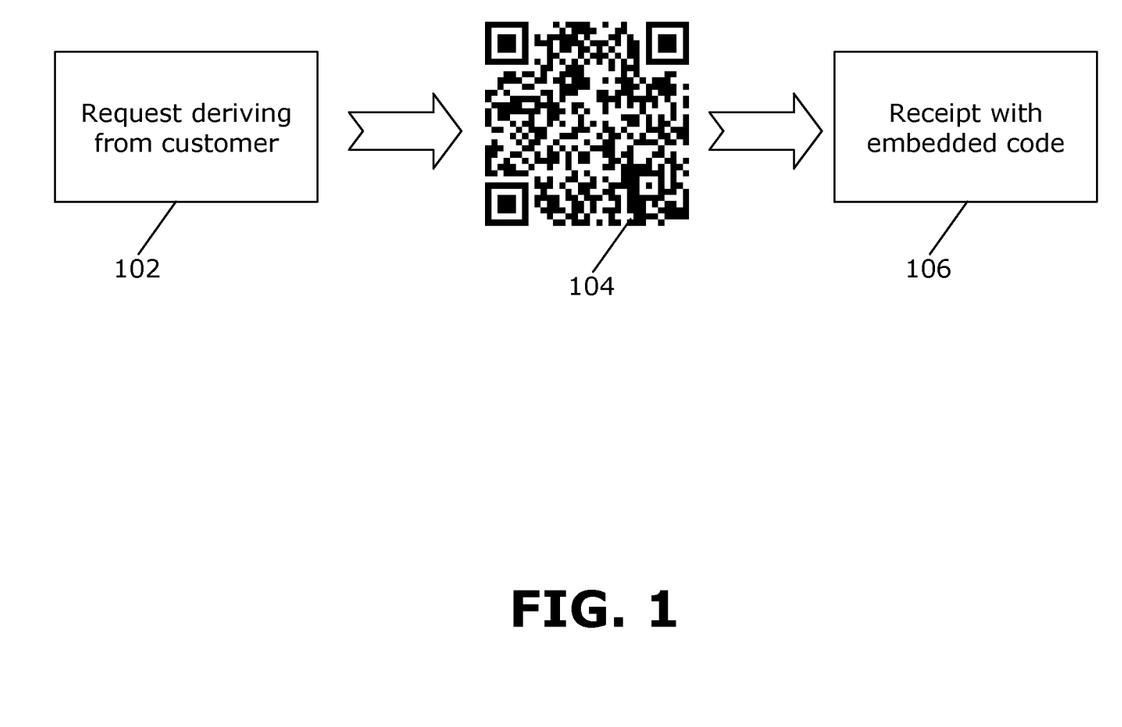
FIG. 1 schematically illustrates a basic operating principle.
Figure 2:
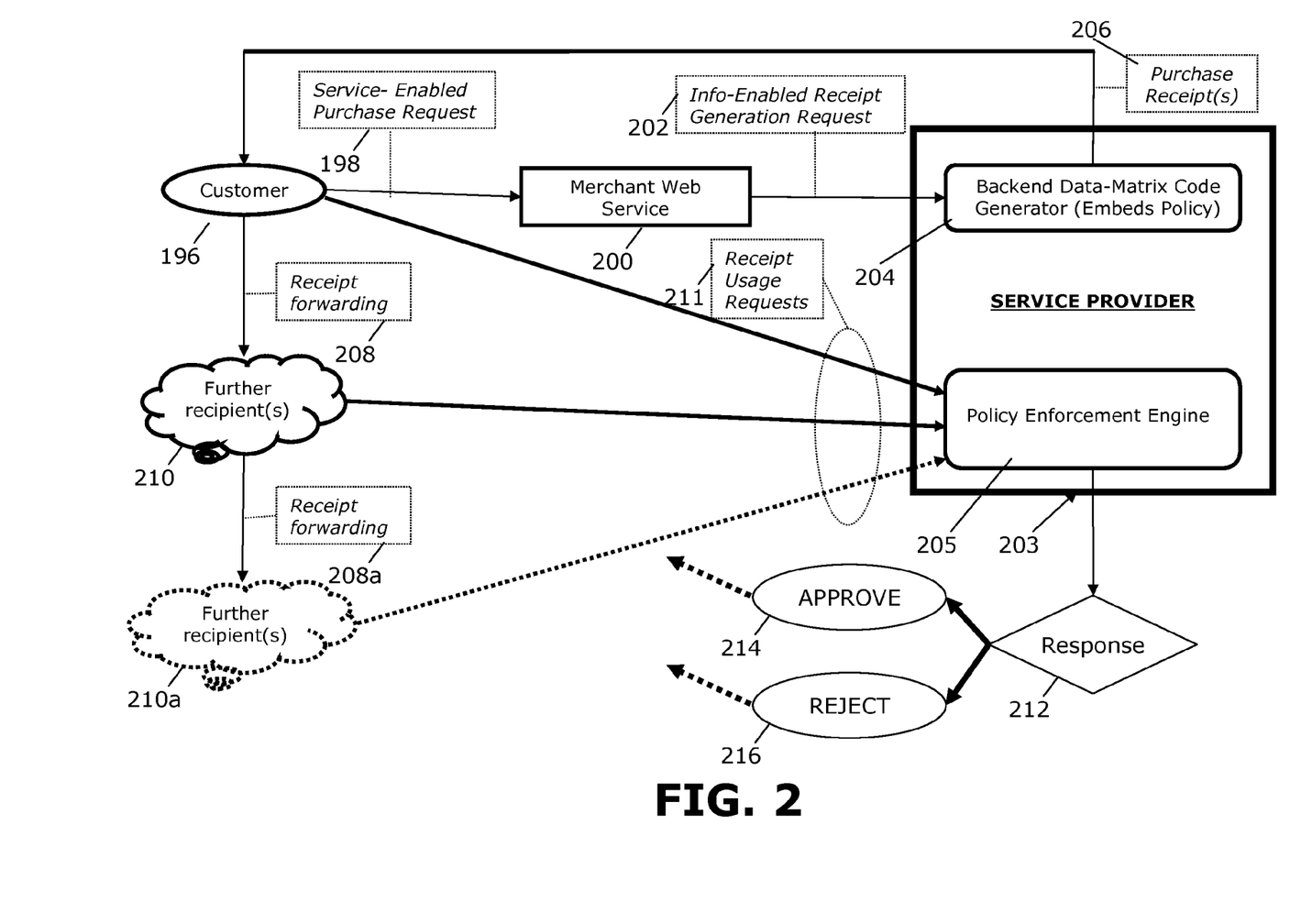
FIG. 2 schematically illustrates a system for processing requests and distributing privileges to contextual communities.

The disclosure now turns to FIGS. 1 and 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

To facilitate easier reference, in advancing from FIG. 1 to and through FIG. 2, a reference numeral is advanced by a multiple of 100 in indicating a substantially similar or analogous component or element with respect to at least one component or element found in at least one earlier figure among FIGS. 1 and 2.

Broadly contemplated herein, in accordance with at least one embodiment of the invention, are methods and arrangements for facilitating the transfer of electronic mercantile instruments, or privileges associated therewith, to an additional individual or to a group or contextual community as specified in advance by a customer, vendor or both.

In accordance with at least one embodiment of the invention, there are broadly contemplated systems and methods for enabling granular distribution of privileges through the use of data matrix codes. As generally known, data matrix codes can take a variety of forms. QR (quick response) codes are a prevalent example, and involve information scrambling; background information can be found at http://www.qrme.co.uk. A QR code is essentially a 2-D bar code with information such as URL, business name, email, logo, which contained therein via scramble-coding. This is but one illustrative example of a type of data matrix coding that can be used in accordance with embodiments of the invention, as other suitable types of data matrix coding indeed can be employed.

In accordance with at least one embodiment of the invention, data matrix codes are employed to carry information that permits the distribution of mercantile instruments or related privileges at a variety of granularities. Such granularity can range from an individual to predefined groups of individuals. Parameters for contextual groups can be tremendously varied, wherein groups can be defined in terms of a grouping on a social network, a geographical region, family relationships, and even in temporal terms such that a mercantile instrument or associated privilege can only be used within a certain time frame (which itself can even be different from, or a subset of, a restricted time frame applied to a main or initial recipient of the mercantile instrument or associated privilege). In this manner, an individual customer can receive a mercantile instrument or associated privilege and transfer or forward the same to another predefined individual or group of individuals. Alternatively, such an instrument or privilege can initially go to an individual or group of individuals without an intermediary individual needed to transfer or forward the instrument or privilege.

In accordance with at least one embodiment of the invention, inasmuch as an instrument or privilege may be provided, transferred or forwarded to at least one individual, the data matrix code can be employed to verify that any recipient indeed is an intended recipient of the instrument or privilege, or at least fulfills at least one predetermined criterion for redeeming, exercising or using the instrument or privilege. In this manner, a data matrix code can be leveraged to permit the receipt of an instrument or privilege within well-defined and controllable contextual sub-communities, rather than random or indeterminate individuals with varying degrees of familiarity or similarity with respect to one another, the vendor or to an intermediary customer.

In accordance with at least one embodiment of the invention, a data matrix code as contemplated herein can be propagated using phone ID's and open web ID's. Because of the inherent restricted use involved in the data matrix code and in details embedded therein, security is easily maintained and phishing-type attacks or other security breaches are easily averted.

By way of general features associated with at least one embodiment of the invention, a synergistic architecture involving merchants and back-end providers is provided, wherein customers can be collaboratively empowered, as individuals or groups, to manage rights purchased or owned by the merchants or back-end providers. Devices with low computing power can be permitted to act as medium for e-commerce, where each entity in the system is empowered to distribute ownership rights.

FIG. 1 schematically illustrates a basic operating principle, in accordance with at least one embodiment of the invention. As shown, a request 102 deriving from a customer triggers production (104) of a data matrix code, which embeds policy attributes as broadly contemplated and discussed herein. A receipt 106 with the code embedded is then propagated to permit at least one customer (e.g., the originally requesting customer) to forward the receipt, containing a mercantile instrument (e.g., a ticket) or associated privileges (e.g., a discount on a ticket), to at least one other individual or group of individuals.

FIG. 2, on a larger scale, schematically illustrates a system for processing requests and distributing privileges to contextual communities. As shown, a customer 196 initiates a service-enabled purchase request 198 to a merchant web service 200. Generated there is an information-enabled receipt generation request 202, fed to a service provider 203 (e.g., a ticket or coupon merchant) and, in particular, a backend data matrix code generator 204 thereof. Generator 204 embeds a data matrix code into a purchase receipt and then propagates the purchase receipt (206) back to originating customer 196.

In accordance with at least one embodiment of the invention, customer 196 then forwards (208) the receipt to at least further recipient 210 (an individual or a group), whereupon at least one further forwarding action (208a) can take place to yet at least one additional recipient 210a (again, an individual or a group). Customer 196 and recipient(s) 210/210a then, at one time or another, attempt to use the mercantile instrument or privilege associated with the purchase receipt (e.g., by displaying an embedded data matrix code to a reader at a movie theater by way of attempting to gain admission to the theater or to get a discount on a movie ticket). By making such a receipt usage request 211, a policy enforcement engine 205 of service provider 203 assesses whether the customer or recipient (196/210/210a) fulfills any necessary criteria (as coded into the data matrix code) for being able to redeem or use the mercantile instrument or associated privilege at hand. A response 212 is thus prompted, and acceptance (214) or rejection (216) of the request is then communicated back to the customer or recipient (196/210/210a), and/or to a "gatekeeper" individual or machine that reads and/or processes the data matrix codes, advising, respectively, as to whether the instrument or privilege indeed can or cannot be used/redeemed.

Though, in accordance with at least one embodiment of the invention, a very wide array of possible applications and uses are conceivable, an illustrative and non-restrictive example might involve a movie theater launching a new campaign, where a customer and others can purchase tickets at a discount if some members of a predetermined group by the same ticket because of the customer's initial recommendation of the movie to members of that group. A telecom operator can delineate the group according to the customer's choice, and SMS (text messages) can be used to propagate data matrix codes facilitating the discounts.

In accordance with this illustrative and non-restrictive example, at ticketing time, the customer (e.g., customer 196 in FIG. 2) receives a ticket via SMS and specifies a particular group among a set of available options. This group can be based on a predefined group in a social media setting, on preferred callers in the customer's phone directory (e.g., "family and friends"), or any other predefined group. The ticket is encrypted as a QR code, with the customer's ID (e.g., mobile phone no.) and the selected group option also embedded therein. Members of the group, as embedded in the code, can be specified by group members' phone numbers or other identifying criteria. When the customer forwards the code to others (e.g., via steps 208/208a as shown in FIG. 2), those others show the QR code and either receive a discount on their own or, in concert with at least one other redemption of the QR code, collectively yield a discount for the entire group. A redemption will be accepted (e.g., step 214 in FIG. 2) if any and all predetermined criteria are fulfilled, or will be rejected (e.g., step 216 in FIG. 2) otherwise. Again, identification can come about via the use of phone numbers or through other suitable identification criteria. Further, mercantile instruments (such as tickets) or privileges (such as discounts) can be contingent on other factors such as timing (e.g., the QR code has to be redeemed by a predetermined expiration date or during certain times of day such as matinee times).

By way of another illustration of features associated with at least one embodiment of the invention, and by way of a non-restrictive example, a telecom operator can generate an e-coupon. The e-coupon can include the following attributes: coupon ID, assignee and policies. The policies can include information on whether or not there is a right for further distribution (e.g., via forwarding), the "depth" to which sharing is permissible (i.e., how many times the coupon can be passed from one individual to another) and a usage count. For coupons purchased among a group of people, this last policy can impose a guideline on usage. In other words, such a policy can impose a maximum usage count (e.g., of 10 people) even as it can be distributed to more people (e.g., 20). In such a scenario, the first 10 people to use the coupon would be able to use the benefit, and it then would be invalidated for the remaining 10 who may be "late" in attempting to use it.

By way of further elaboration, in accordance with at least one embodiment of the invention, if a telecom company would like to allow an e-coupon to be circulated, then it can embed designated individual ID's, and mark the first recipient (e.g., customer 196 in FIG. 2) as the primary redeemer of the coupon (e.g., "assignee"). Only when the primary redeemer forwards it, will the designated set then be active. The designated set can be randomly chosen by the telecom provider from the set of all numbers that the first recipient has recently called, or it can be a set of users selected based on a rule, such as top 10 most frequently called numbers by the primary recipient. The designated set can also be predetermined by the primary redeemer.

In accordance with the present illustrative example, a first-level user (e.g., such as the initial customer 196 shown in FIG. 2) uses the coupon successfully, as it is validated by the service provider. When the first-level user then attempts to distribute the coupon (e.g., as in step 208 in FIG. 2), the coupon is decrypted by the first-level user's device, the distribution group is ascertained and, for those recipients (e.g., such as a recipient 210 in FIG. 2) who are part of the distribution group, they receive the coupon via a message and the tracked sharing depth is incremented by one.

In accordance with the present illustrative example, a second-level user (e.g., such as a recipient 210 shown in FIG. 2) attempts to distribute the coupon further but in this case in unsuccessful, with a sharing depth violation discovered. More particularly, as this second-level user attempts to distribute the coupon further, the attempt is unsuccessful inasmuch as a sharing depth of only one was originally set. When the attempt is made and a forwarding message is received at the policy enforcement engine 205, a check is made as to depth and, upon the violation being detected, a failure message is sent back to user 210 indicating that indeed the depth violation was detected. Such a message could say, for instance, "You are not authorized to distribute the coupon".

In accordance with at least one embodiment of the invention, a very wide range of application scenarios are conceivable beyond those already discussed. For instance, in the finance and banking sector, authorization power can be handed out to select groups of people, e.g., family members. In the public sector, privileges associated with a position or role can be delegated to members of a team for a predetermined time period. In the health sector, if a doctor wishes to ensure a patient's continued care when the doctor is on leave, he or she can forward an data matrix coded message (containing patient details) to a group of eligible doctors. The patient can visit the eligible set of doctors only if previous health data is required. The eligible set of doctors are prevented from forwarding the details to anyone else due to a policy check at the backend relating to sharing depth.

Figure 3:
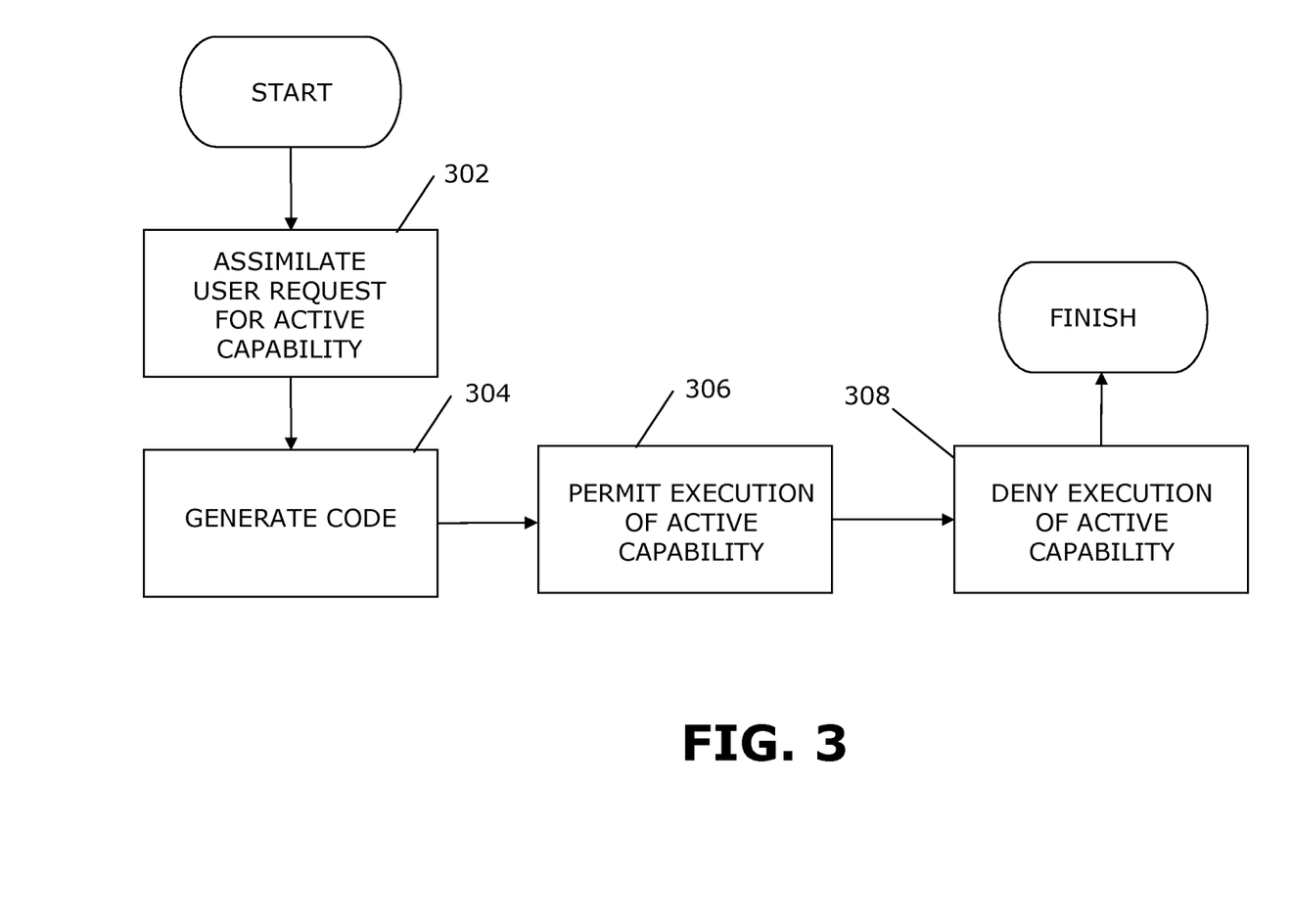
FIG. 3 sets forth a process more generally for the granular distribution of privileges to contextual communities.

FIG. 3 sets forth a process more generally for the granular distribution of privileges to contextual communities, in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12' in FIG. 4. In accordance with an example embodiment, most if not all of the process steps discussed with respect to FIG. 3 can be performed by way a processing unit or units and system memory such as those indicated, respectively, at 16' and 28' in FIG. 4.

As shown in FIG. 3, a user request for an active capability is assimilated (302). A code is generated which permits exercise of the active capability by the user and at least one secondary recipient (304). Execution of the active capability is permitted responsive to an attempt at executing the active capability by at least one taken from the group consisting of: the user and the at least one secondary recipient (306), and execution of the active capability is denied responsive to an attempt at executing the active capability by a recipient other than the user and the at least one secondary recipient (308).

Figure 4:
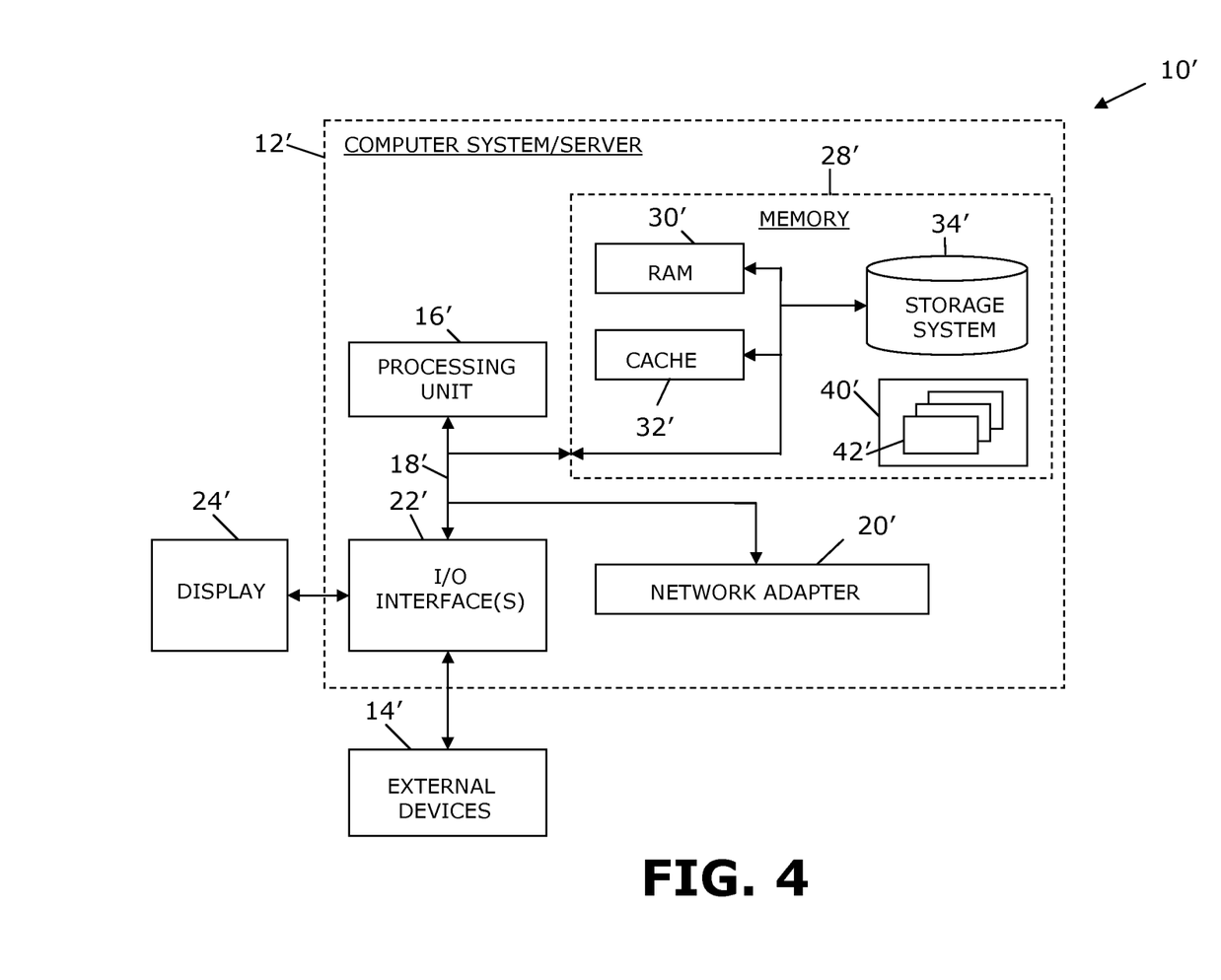
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
assimilating a user request for an active capability of an electronic instrument;
generating a code and embedding the code within the electronic instrument, wherein the code permits exercise of the active capability by the user and at least one secondary recipient, wherein the at least one secondary recipient comprises at least one recipient identified by the user through forwarding of the electronic instrument to the at least one recipient;
permitting execution, by a policy enforcement engine, of the active capability responsive to an attempt at executing the active capability by at least one taken from the group consisting of: the user and the at least one secondary recipient, wherein the permitting execution of the active capability comprises determining that the one of: the user and the at least one secondary recipient is authorized to execute the active capability; and
denying execution, by a policy enforcement engine, of the active capability responsive to an attempt at executing the active capability by a recipient other than the user and the at least one secondary recipient, wherein the denying execution of the active capability comprises determining that the recipient other than the user and the at least one secondary recipient is not authorized to execute the active capability;
wherein said generating comprises imparting a use policy to the code;
the use policy comprising a distribution policy;
the distribution policy relating to a sharing depth with respect to the user.

2. The method according to claim 1, wherein the code comprises a data matrix code.

3. The method according to claim 1, wherein the active capability comprises redemption of a privilege.

4. The method according to claim 3, wherein the privilege comprises a privilege related to a mercantile instrument.

5. The method according to claim 1, wherein the use policy governs said steps of permitting and denying.

6. The method according to claim 1, wherein the use policy comprises a maximum usage count.

7. The method according to claim 1, wherein the at least one secondary recipient is preselected by the user.

8. The method according to claim 1, wherein the at least one secondary recipient comprises at least one taken from the group consisting of: at least one randomly selected secondary recipient, at least one secondary recipient selected automatically by rule.

9. The method according to claim 1, wherein the use policy relates to a gross number of shares of the code between the user and the at least one secondary recipient, wherein the gross number of shares impacts execution of the active capability.

10. An apparatus comprising:
at least one processor; and
a computer readable storage medium having computer readable program code embodied therewith and executable by the at least one processor, the computer readable program code comprising:
computer readable program code configured to assimilate a user request for an active capability of an electronic instrument;
computer readable program code configured to generate a code and embed the code within the electronic instrument, wherein the code permits exercise of the active capability by the user and at least one secondary recipient, wherein the at least one secondary recipient comprises at least one recipient identified by the user through forwarding of the electronic instrument to the at least one recipient;
computer readable program code configured to permit execution, by a policy enforcement engine, of the active capability responsive to an attempt at executing the active capability by at least one taken from the group consisting of: the user and the at least one secondary recipient, wherein the computer readable program code configured to permit execution of the active capability is further configured to determine that the at least one of the user and the at least one secondary recipient is authorized to execute the active capability; and
computer readable program code configured to deny execution, by a policy enforcement engine, of the active capability responsive to an attempt at executing the active capability by a recipient other than the user and the at least one secondary recipient, wherein the computer readable program code configured to deny execution of the active capability is further configured to determine that the recipient other than the user and the at least one secondary recipient is not authorized to execute the active capability;
wherein the computer readable program code configured to generate the code is further configured to impart a use policy to the code;
the use policy comprising a distribution policy;
the distribution policy relating to a sharing depth with respect to the user.

11. A computer program product comprising:
a non-transitory computer readable storage medium having computer readable program code embodied therewith, the computer readable program code comprising:
computer readable program code configured to assimilate a user request for an active capability of an electronic instrument;
computer readable program code configured to generate a code and embed the code within the electronic instrument, wherein the code permits exercise of the active capability by the user and at least one secondary recipient, wherein the at least one secondary recipient comprises at least one recipient identified by the user through forwarding of the electronic instrument to the at least one recipient;
computer readable program code configured to permit execution, by a policy enforcement engine, of the active capability responsive to an attempt at executing the active capability by at least one taken from the group consisting of: the user and the at least one secondary recipient, wherein the computer readable program code configured to permit execution of the active capability is further configured to determine that the at least one of the user and the at least one secondary recipient is authorized to execute the active capability; and
computer readable program code configured to deny execution, by a policy enforcement engine, of the active capability responsive to an attempt at executing the active capability by a recipient other than the user and the at least one secondary recipient, wherein the computer readable program code configured to deny execution of the active capability is further configured to determine that the recipient other than the user and the at least one secondary recipient is not authorized to execute the active capability;
wherein the computer readable program code configured to generate the code is further configured to impart a use policy to the code;
the use policy comprising a distribution policy;
the distribution policy relating to a sharing depth with respect to the user.

12. The computer program product according to claim 11, wherein the code comprises a data matrix code.

13. The computer program product according to claim 11, wherein the active capability comprises redemption of a privilege.

14. The computer program product according to claim 13, wherein the privilege comprises a privilege related to a mercantile instrument.

15. The computer program product according to claim 11, wherein the use policy governs said computer readable program code configured to permit execution and deny execution.

16. The computer program product according to claim 11, wherein the use policy comprises a maximum usage count.

17. The computer program product according to claim 11, wherein the at least one secondary recipient is preselected by the user.

18. The computer program product according to claim 11, wherein the at least one secondary recipient comprises at least one taken from the group consisting of: at least one randomly selected secondary recipient, at least one secondary recipient selected automatically by rule.

19. The computer program product according to claim 11, wherein the use policy relates to a gross number of shares of the code between the user and the at least one secondary recipient, wherein the gross number of shares impacts execution of the active capability.

* * * * *